US009073642B2

(12) United States Patent  
Fitzgerald

(10) Patent No.: US 9,073,642 B2  
(45) Date of Patent: Jul. 7, 2015

(54) LINK-LESS PARACHUTE CANOPY RELEASE

(71) Applicant: Adam J. Fitzgerald, East Hartford, CT (US)

(72) Inventor: Adam J. Fitzgerald, East Hartford, CT (US)

(73) Assignee: Capewell Aerial Systems LLC, South Windsor, CT (US)

( * ) Notice: Subject to any disclaimer, the term of this patent is extended or adjusted under 35 U.S.C. 154(b) by 299 days.

(21) Appl. No.: 13/707,975

(22) Filed: Dec. 7, 2012

(65) Prior Publication Data

US 2013/0146713 A1 Jun. 13, 2013

Related U.S. Application Data

(60) Provisional application No. 61/568,304, filed on Dec. 8, 2011.

(51) Int. Cl.  
*B64D 17/38* (2006.01)

(52) U.S. Cl.  
CPC ...................... *B64D 17/38* (2013.01)

(58) Field of Classification Search  
USPC .............. 244/142, 143, 151 R, 151 A, 151 B; 24/573.11, 323; 446/49  
See application file for complete search history.

(56) References Cited

U.S. PATENT DOCUMENTS

| 2,914,273 | A | * | 11/1959 | Bolton et al. | 244/151 A |
| 3,237,264 | A | * | 3/1966 | Turolla | 24/323 |
| 3,760,464 | A | * | 9/1973 | Higuchi | 24/323 |
| 3,767,143 | A | * | 10/1973 | Gaylord | 244/151 A |
| 4,562,623 | A | * | 1/1986 | Jeswine | 24/579.11 |
| 4,684,083 | A | * | 8/1987 | Maziarz | 244/151 A |
| 6,412,430 | B1 | * | 7/2002 | Johnston | 112/475.06 |
| 6,644,597 | B1 | * | 11/2003 | Bahniuk | 244/151 B |
| 2012/0256054 | A1 | * | 10/2012 | Tayar | 244/151 B |

* cited by examiner

*Primary Examiner* — Benjamin P Lee  
(74) *Attorney, Agent, or Firm* — Alix, Yale & Ristas, LLP

(57) ABSTRACT

A canopy release assembly comprising a riser, a webbing stopper attached to said riser, a harness, and a release body assembly attached to the harness. The release body comprises a body frame attached to the harness, a clamp pivotally attached to the body frame and having a clamp bar, a latch pivotally attached to the body frame and having a lanyard, and a safety cover pivotally attached relative to the body frame. A method for attaching the canopy release assembly to the riser comprises inserting a webbing stopper through a gap in the clamp having a dimension $G_1$ pivoting the clamp such that $G_1$ narrows to a dimension $G_2$ narrower than the thickness T of the webbing stopper, retaining said webbing stopper in a cage cavity.

21 Claims, 9 Drawing Sheets

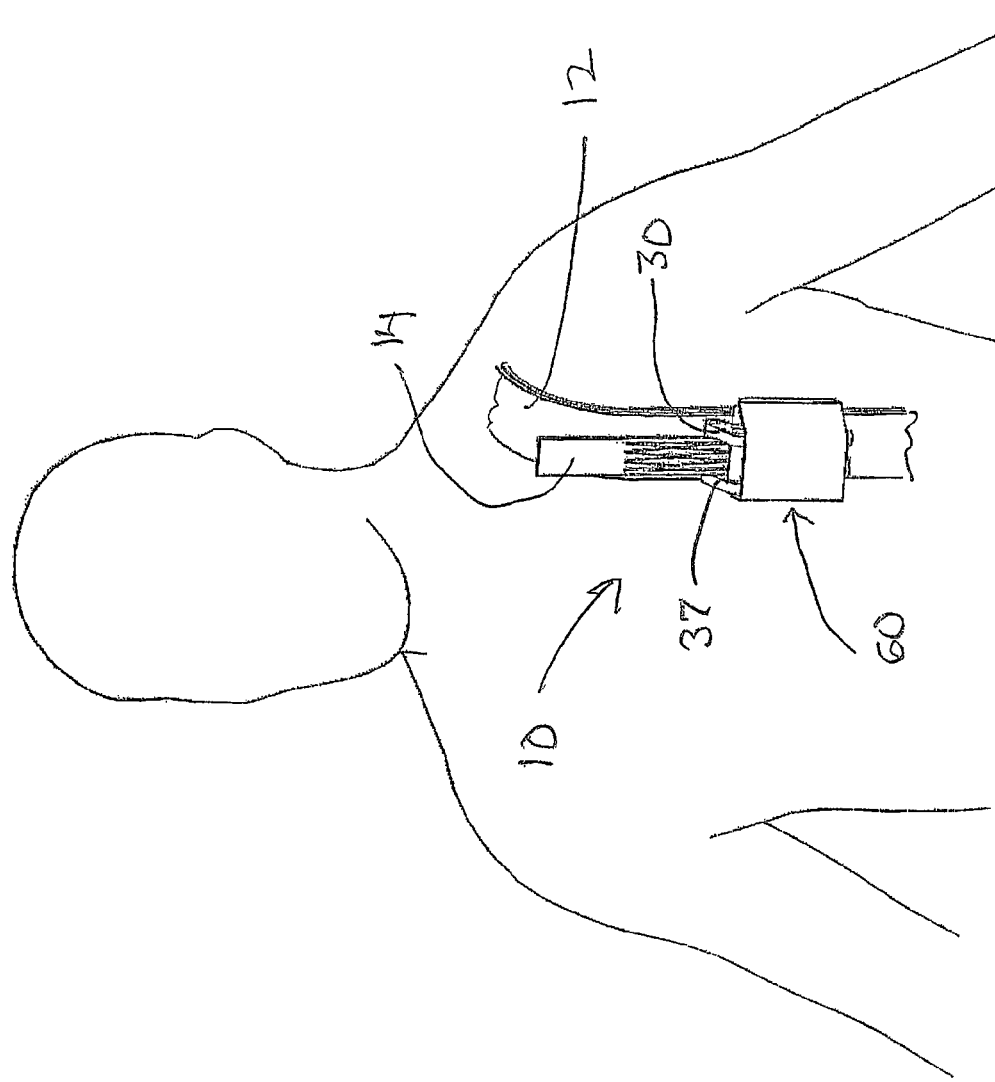

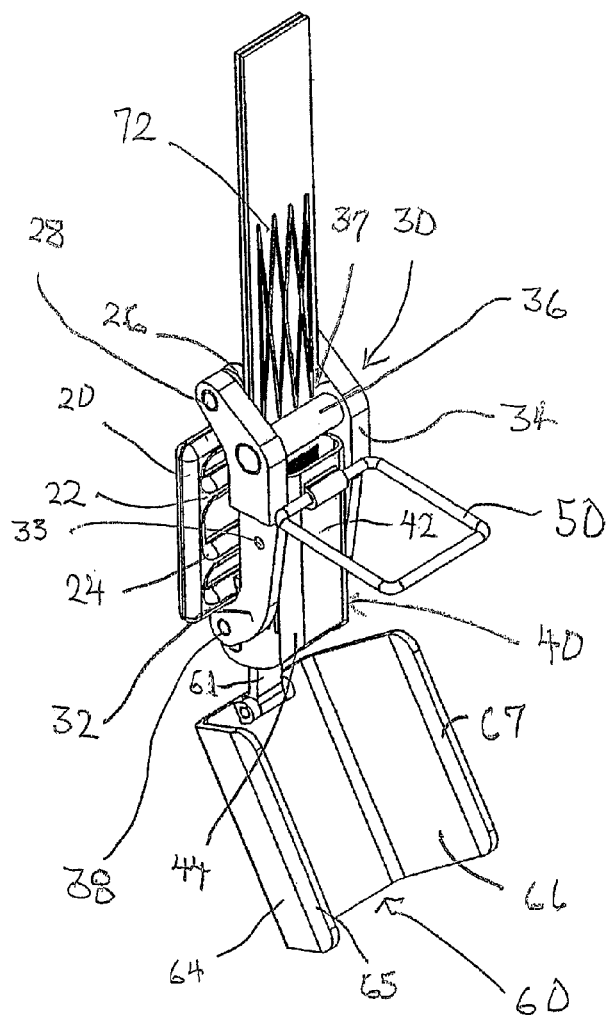
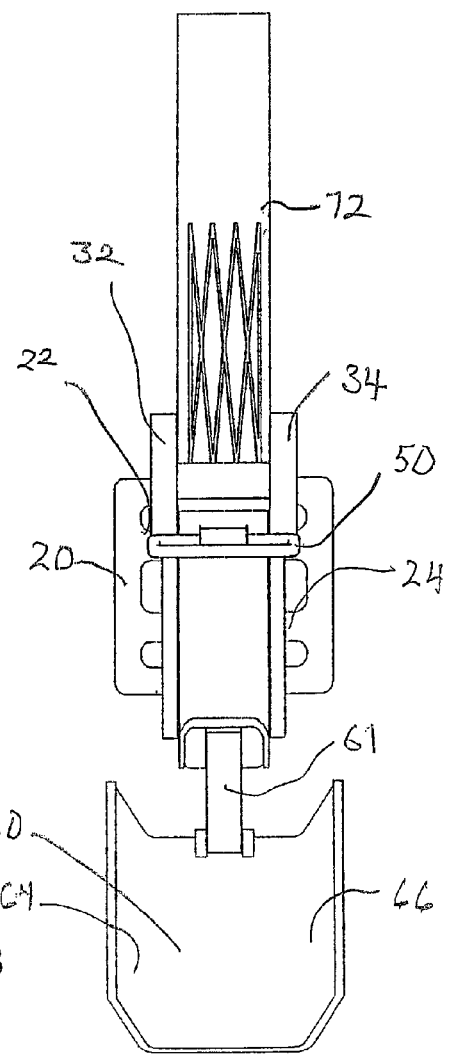
Fig. 5A
Fig. 5B

LINK-LESS PARACHUTE CANOPY RELEASE

BACKGROUND

This disclosure relates generally to devices which join a parachute harness to the risers of a parachute, and allow the parachute to be easily disconnected. More particularly this disclosure relates to a parachute canopy release.

In parachute technology to which the present disclosure relates, devices which are employed for parachute canopy releases typically employ metal structures for both component portions of the release. For parachute technology employed in military applications, a recurring problem is the weight of equipment carried by a paratrooper. A fully combat equipped paratrooper may easily be carrying over 100 lbs. of gear. An additional issue that is presented by metal fittings employed in parachute canopy releases is that a metal fitting on a freed riser can strike nearby personnel. The potential for injury is of particular concern when a single riser is released rather than both risers concurrently.

Structural integrity and operative reliability are required design constraints that cannot be compromised in any parachute canopy release.

SUMMARY

Briefly stated, a link-less canopy release comprises a riser, a webbing stopper attached to the riser, a harness, and a releasable body assembly attached to the harness. The releasable body assembly comprises a body frame attached to the harness, a clamp having a clamp bar, a latch having a lanyard, and a safety cover.

The clamp is pivotally attached to the body frame and displaceable between an open/release position and a closed position. The lanyard is attached to the latch such that the latch is manually manipulable between a latched position wherein said clamp is retained in the closed position, and an unlatched position, releasing the clamp and allowing the clamp to pivot into an open/release position. When in the closed position the clamp defines a gap having a dimension $G_1$. When in the open release position the clamp defines a gap having a dimension $G_2$.

The safety cover is pivotally attached to the body frame such that the safety cover is displaceable between a secured position wherein said safety cover retains the clamp, latch and lanyard in the latched position and an unsecured position where the safety cover allows access to the latch and lanyard.

The riser is secured to the parachute by passing the webbing stopper through the enlarged gap when the clamp is in the open/release position. The clamp is pivoted into the closed position. The clamp bar and the body retain the webbing stopper. The latch is maneuvered into the latched position securing the clamp in the closed position. The safety cover is displaced, retaining the latch and clamp in the secured position.

The link-less parachute canopy release of the current disclosure is significantly reduced in weight, yet provides a secure connection between a parachutist's harness and the parachute riser. The current disclosure reduces the amount that a parachutist must carry without sacrificing the retention forces between the canopy release and the parachute riser.

Additionally, manufacture of the link-less canopy release reduces the part count and the time required to manufacture the connection between a parachute riser and a harness. Since links do not need to be sewn into the riser, canopy release or both, the link-less canopy release of the current disclosure eliminates additional elements and steps necessary to manufacture a complete connection.

The link-less canopy release also reduces the potential for injury to surrounding personnel after a parachutist has landed. Because the riser consists substantially of webbing, there are no metal fittings on the riser that may strike nearby personnel, thereby reducing the likelihood and severity of injury to a fellow parachutist struck by a freed riser.

Although the apparatus and methods disclosed herein were designed with parachute applications primarily in mind, a link-less connector system in accordance with the aspects of the present disclosure may be utilized in any situation where it is necessary to securely join two pieces of webbing such that they are quickly releasable.

BRIEF DESCRIPTION OF THE DRAWINGS

FIG. 3 is a frontal perspective view of the link-less canopy release, harness strap portion and riser strap portion of FIG. 1 in a secured position as positioned on a parachutist partially illustrated in silhouette;

FIGS. 5A-5D are respectively perspective, front, side and rear views of the canopy release as configured in FIGS. 2.

DETAILED DESCRIPTION OF THE PREFERRED EMBODIMENT

Figure 1:
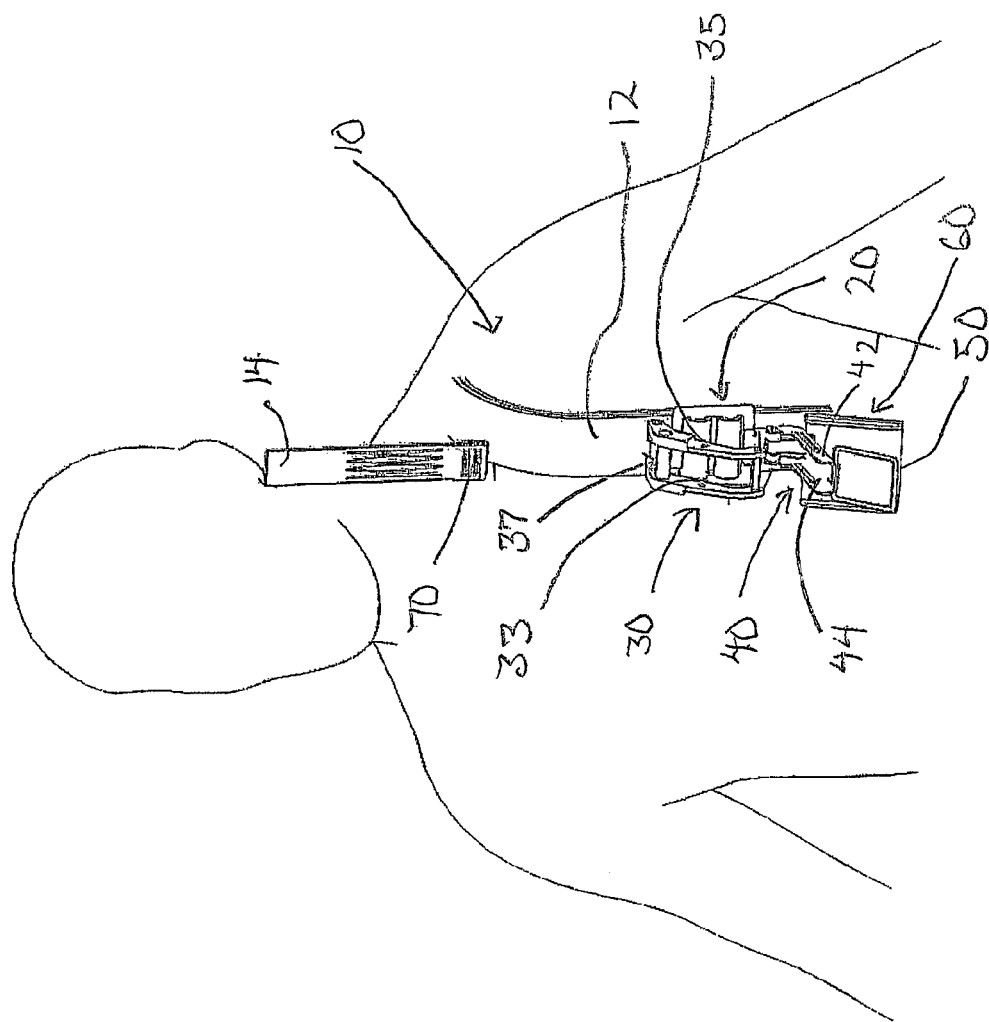
FIG. 1 is a frontal perspective view of a link-less canopy release together with a harness strap (partially illustrated), a riser strap (partially illustrated) as positioned on a parachutist partially illustrated silhouette, the clamp configured in an opened/released operative mode, the latch configured in an unlatched position and the safety cover configured in the unsecured position.

With reference to the drawings wherein like numerals represent like parts throughout the figures, a link-less parachute canopy release is generally designated by the numeral 10. The parachute canopy release 10 functions to join the harness 12 (partially illustrated) for a parachutist to a riser 14 (partially illustrated) of a parachute (not illustrated) and to allow the parachute to be easily disconnected from the harness when desired. In a traditional application there is a release at each side of the harness adjacent the shoulder of the parachutist which connects with a respective riser. Traditionally, the parachute canopy is released by a quick two-stage manual operation by the parachutist while each riser is under tension.

The parachute is released either after landing or during the descent if malfunction warrants jettisoning the main canopy. Both releases 10 (only one illustrated) must be opened to jettison the parachute during descent. After landing, opening either canopy release 10 will ordinarily be sufficient to cause the parachute to deflate and prevent the parachutist from being dragged by ground level winds.

Figure 2:
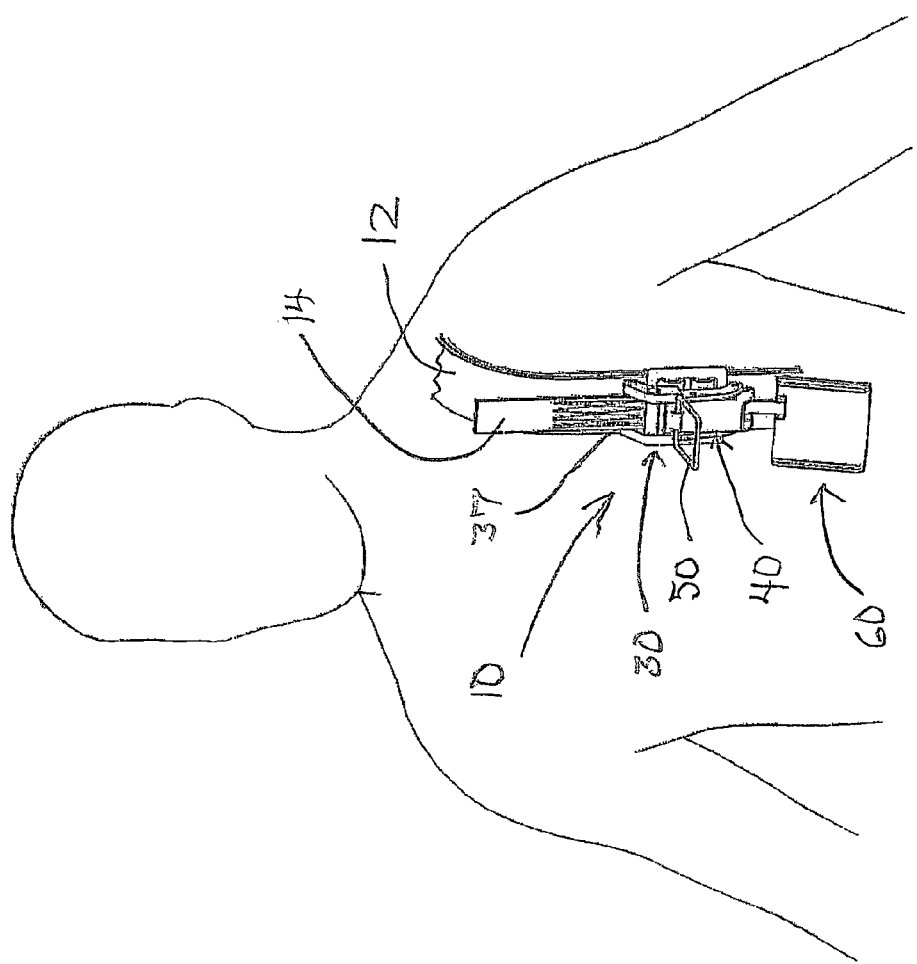
FIG. 2 is a frontal perspective view of the link-less canopy release, harness portion and riser strap portion of FIG. 1 as positioned on a parachutist partially illustrated in silhouette, the clamp configured in a closed position, the latch configured in a latched position and the safety cover configured in the unsecured position.

As best illustrated in the FIGS. 1-3, the link-less canopy release 10 is transformable from an open/release mode of FIG. 1 to a latched mode of FIG. 2, to a secured mode of FIG. 3 wherein the parachute is fully secured to the harness 12 and ready for descent. One connecting portion of the release 10 does not employ a metal compartment and can be characterized as link-less.

With additional reference to FIGS. 4A-6D, the release 10 comprises a body frame 20 which includes a pair of parallel buckle bars 22, 24 which are stitched or otherwise attached to the harness 12. The body frame 20 includes an upper header 26 which receives a pivot rod 28 for pivotally mounting a clamp arm assembly 30.

The clamp arm assembly 30 preferably comprises a pair of pivotal clamp arms 32, 34 having a quasi-C-shaped configuration. The arms 32, 34 are transversely spaced steel components. A clamp bar 36 extends transversely between the two arms at an upper intermediate location thereof. An intermediate portion of the clamp arms has a throughbore or an aperture 33, 35 which functions as a detent as will be described below. The lower end portion of the clamp arms mounts a transverse latch bar 38. The clamp arm assembly could be a single forged piece.

Figures 4A, 4B:
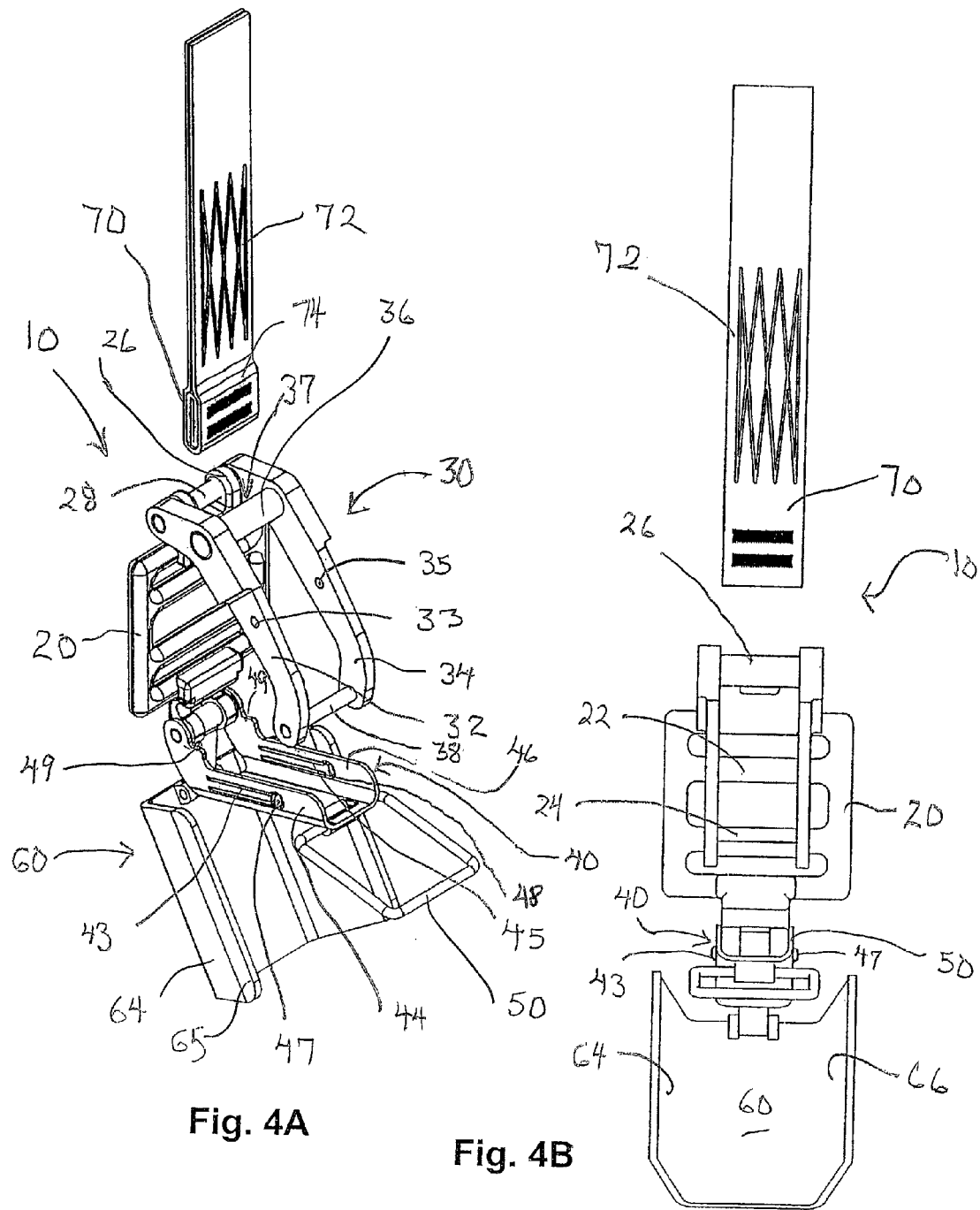
FIGS. 4A-4D are respectively perspective, front, side and rear views of the canopy release as configured in FIG. 1.
Figure 4C:
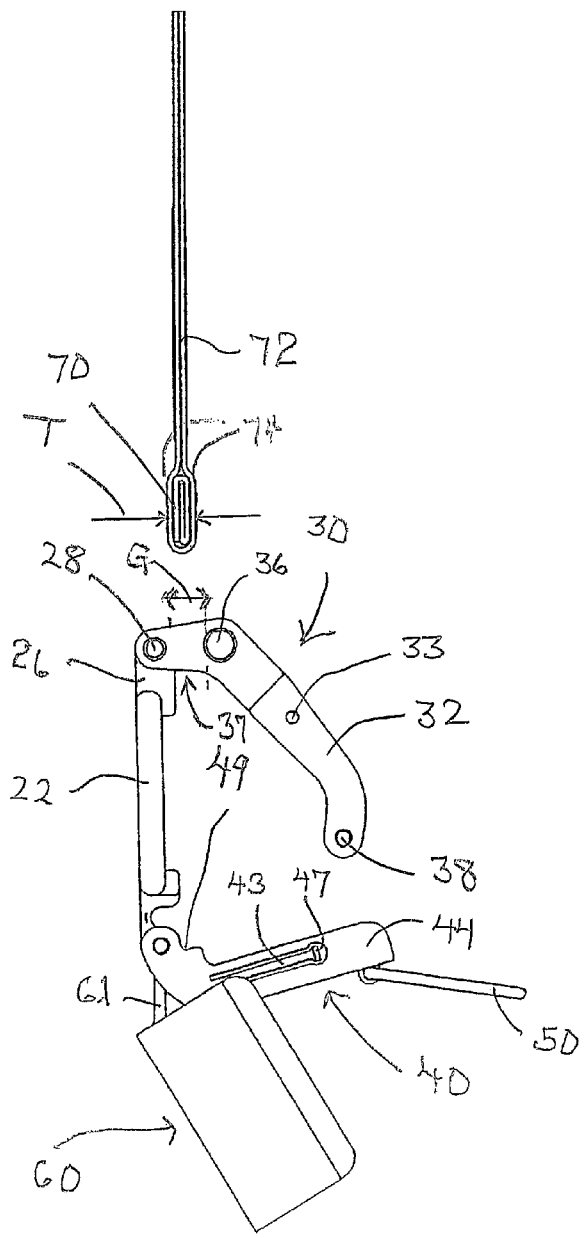
Figure 4D:
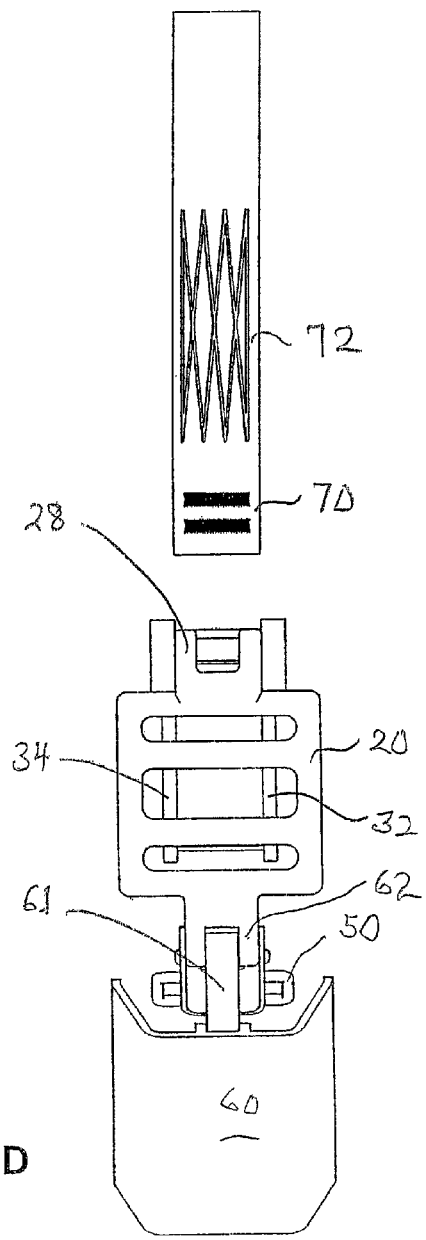
Figure 5C:
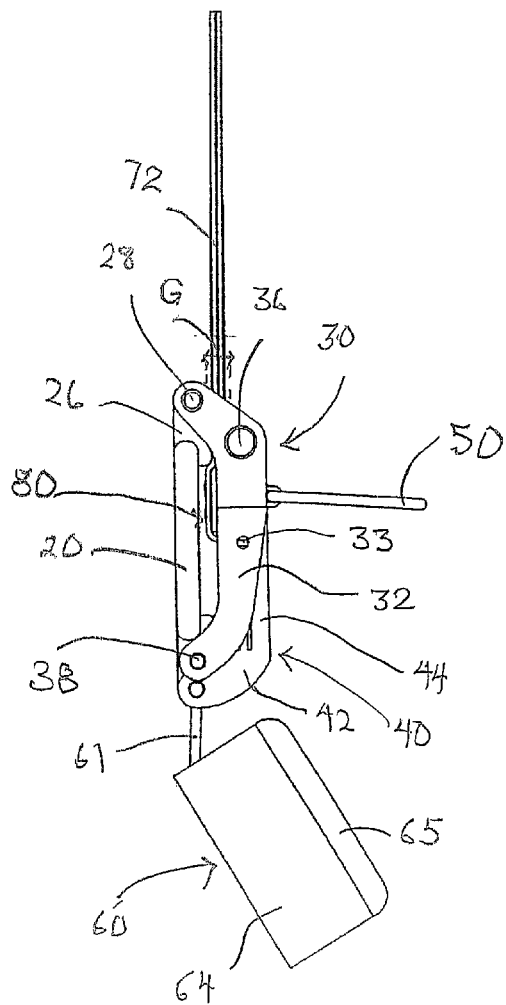
Figure 5D:
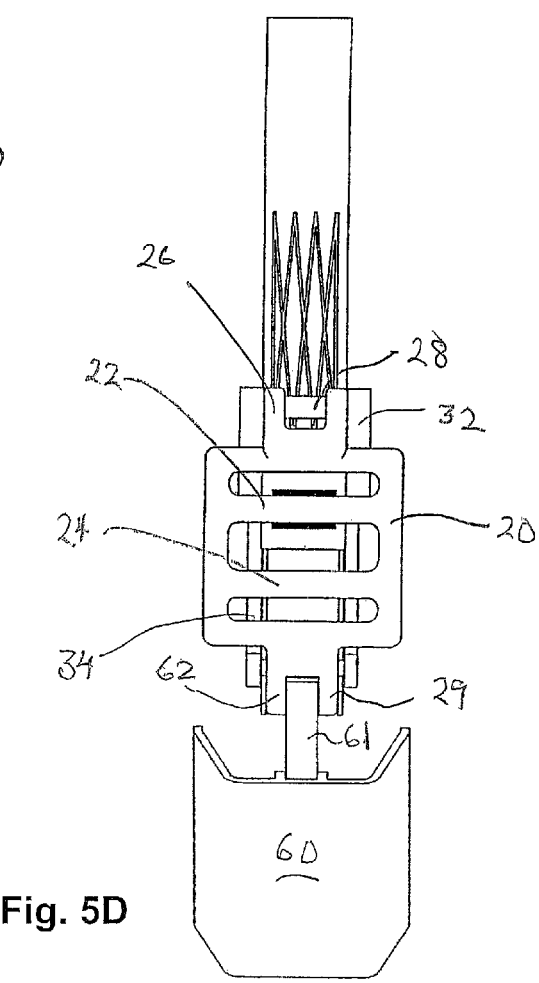
Figure 6A:
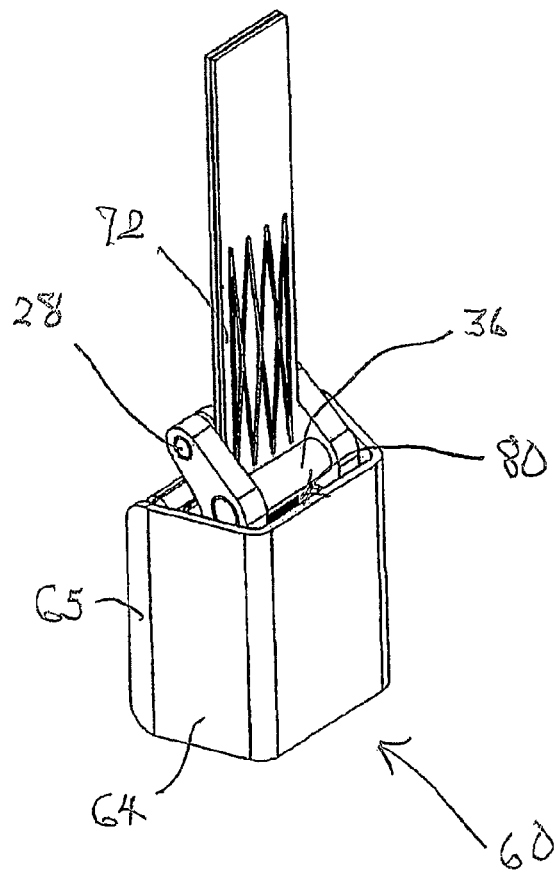
FIGS. 6A-6D are respectively perspective, front, side and rear views of the canopy release as configured in FIG. 3.
Figure 6B:
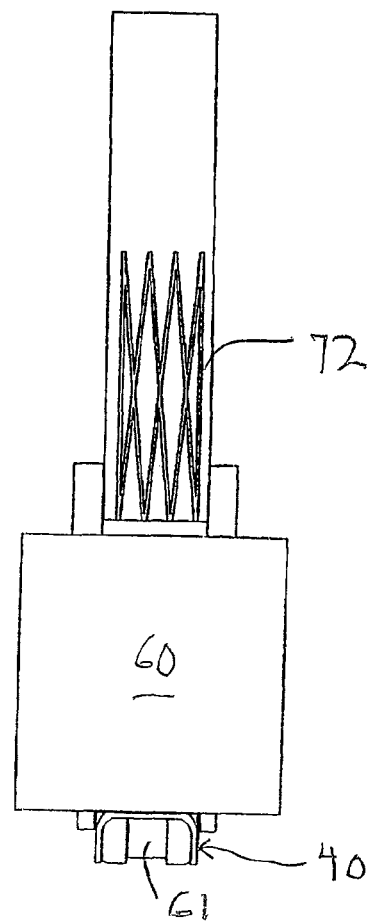
Figure 6C:
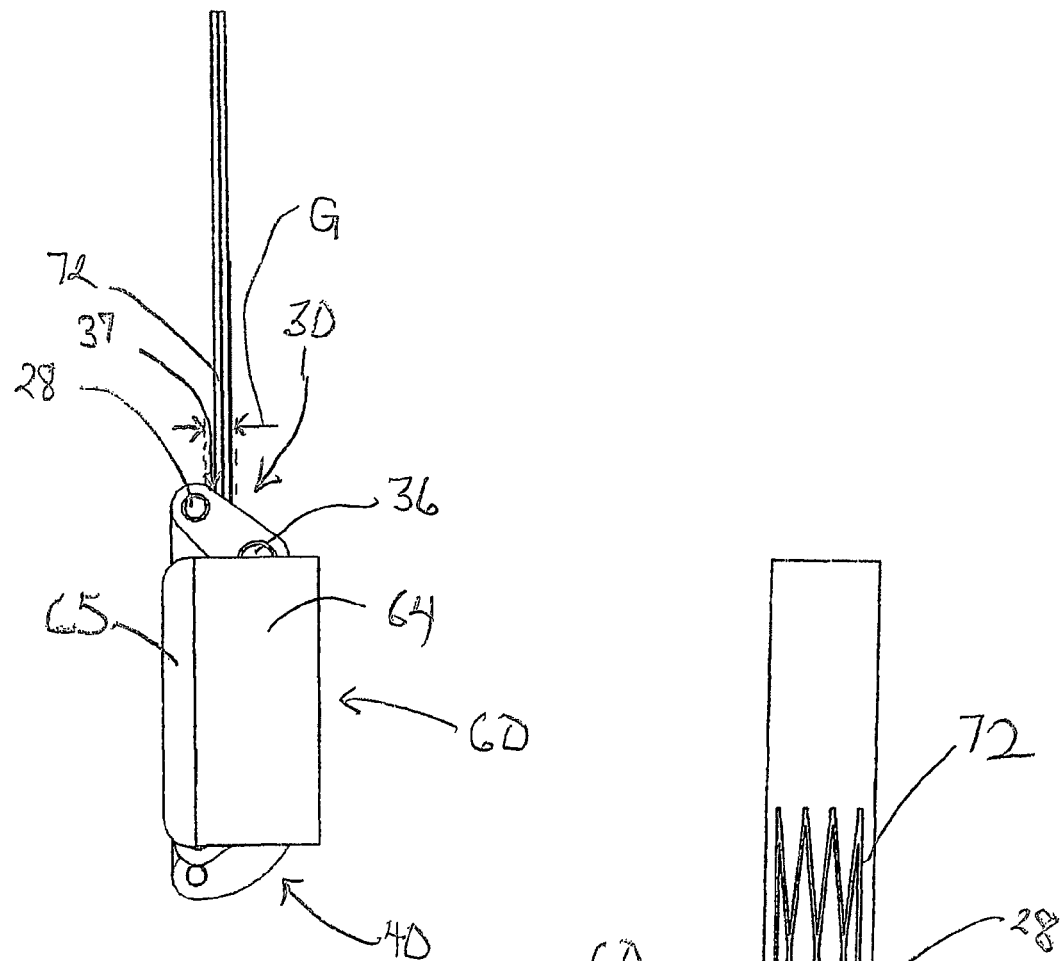
Figure 6D:
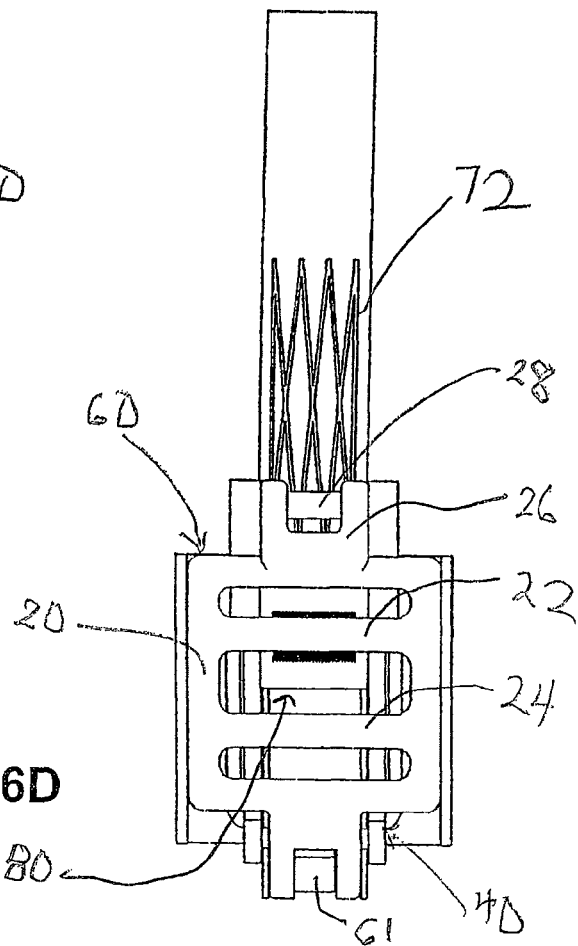

It will be appreciated that in the open/release position, as best illustrated in FIGS. 1 and 4C, the clamp bar 36 defines a gap 37, with the body frame 20, having a dimension $G_1$. The pivot rod 28, clamp bar 36 and latch bar 38 of the clamp arm assembly are substantially parallel. When the clamp arm assembly 30 is pivoted downwardly, the gap narrows as the clamp bar moves closer to the body frame 20 to restrict the opening 37, and define a gap having a dimension $G_2$.

A latch assembly 40, which may comprise a quasi J-shaped arm 42 with a U-shaped section, is pivotally mounted to the lower portion of the body frame. The body frame 20 also includes a lower header 52 which receives a pivot rod 54 for pivotally mounting the latch assembly 40. Sides 44, 46 of the latch are dimensioned and transversely spaced so that the latch arm 42 is received and nestled between the clamp arms 32, 34 when the latch arm 42 is pivoted upwardly to the latched position of FIG. 2. The sides include a pair of integral leaf springs 43, 45 with opposed tabs 47, 48 which are receivable in the apertures 33, 35 of the clamp assembly 30 for retaining the clamp in the closed position when in the latched position. The upper end of the latch arm 42 mounts a lanyard assembly 50 which is pivotable about a transverse axis and preferably has a quasi-ring-like form. The lanyard 50 pivotally displaces the latch between the latched position of FIGS. 2 and 5A-D and an unlatched position depicted in FIGS. 1 and 4A-D, where the clamp 30 is released to an open/release position.

A safety cover 60 is also mounted to a tongue 62 at the lower end of the frame 20 (or may be pivoted to the latch assembly 40). In one embodiment, the cover 60 is spring biased by a flat spring 61 toward a secured position wherein it encloses the clamp assembly 30 and the latch assembly 40 when the lanyard 50 is pivoted to engage against the latch arm 42. The cover 60 has a pair of sides 64, 66 which resiliently engage at the outer intermediate side of the clamp arms 32, 34. The clamp arms 32, 34 are outwardly recessed with a shoulder to resiliently accommodate and slidably engage the cover 60. The sides preferably each have a guide skirt 65, 67 to allow the cover 60 to snap into position over the latch assembly 40 and clamp assembly 30. As best illustrated in FIG. 3, the flat spring 61 provides the pivotal connection between the tongue 62 and the safety cover 60. In one embodiment, the safety cover 60 may carry a pair of lock tabs (not illustrated) which inwardly engage the apertures 33, 35 of the clamp arms.

A webbing stopper 70 comprises webbing material which is folded over and stitched or otherwise connected in place at the end of a strap 72 to the riser 14. The upper portions 74 of the stopper are contoured or inclined. The effective thickness T, which is preferably uniform, of the webbing stopper 70 is such that when the clamp assembly is in the clamped position (FIGS. 2, 3), the gap dimension $G_2$ of the opening 37 is significantly less than the thickness T of the webbing stopper. In the opened/released position (FIG. 1), the gap dimension $G_1$ is greater than the thickness T of the stopper 70.

The parachute canopy release 10 is closed by passing the webbing stopper 70 through the gap 37 when the latch assembly is in the open/release position so that the webbing stopper is received in a cage cavity 80 formed between the release body frame 20 and the clamp assembly 30. The clamp arm assembly 30 is then pivoted downwardly to the closed position. The latch is pivoted upwardly toward the clamp assembly so that the latch bar is captured in the latch cradle 49 (FIG. 4C) and the tabs 47, 48 are received in the apertures 33, 35 of the clamp assembly. It will now be appreciated that the thick end of the webbing stopper 70 is captured in the cage cavity 80 and cannot pass back through the release opening 37. It should also be appreciated that the action of passing the stopper end 70 through the gap 37 cannot be completed if the stopper has not passed a sufficient distance through the opening 37 into the cavity 80.

The lanyard 50 is then folded downwardly and the safety cover 60 is pivoted upwardly into its secured position with the sides 64, 66 resiliently interiorly engaging the recessed portions of the clamp arms 32, 34. The parachute canopy or the parachute is now releasably connected to the harness at each shoulder of the parachutist.

The parachute is easily and efficiently released from the harness at each release assembly 10 by initially pulling the safety cover 60 open by manually pivoting the cover downwardly into an unsecured position, allowing access to the lanyard 50. The lanyard 50 is pulled outward so that the latch locking tabs 47, 48 disengage from the clamp assembly 30. With the latch assembly 40 at least partially configured in the unlatched position, the upward tension of the riser will force the clamp further open to enlarge the gap 37 and will allow the webbing stopper 70 to escape through the gap 37 (now having gap $G_1$ greater in dimension than stopper thickness T), and the parachute to separate from the harness 12. The geometry of the stopper upper portions 74 facilitates passing of the webbing stopper 70 from the opening 37. It will be appreciated that during descent both of the releases 10 must be open to jettison the parachute. When the parachutist is on the ground opening either release 10 will typically, sufficiently deflate the parachute to prevent the parachutist from being dragged by ground level winds.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed:

1. A canopy release assembly comprising:
    a riser;
    a webbing stopper attached to said riser comprising webbing material;
    a harness;
    a releasable body assembly attached to said harness comprising:
        a body frame attached to said harness;
        a clamp pivotally attached to said body frame and having a pair of arms which carry a clamp bar, said clamp being pivotally displaceable between a closed position defining a gap with said body frame having a dimension $G_2$ and an open/release position defining a gap having a dimension $G_1$ wherein $G_1$ is larger than $G_2$;

a latch pivotally attached to said body frame and having a lanyard to pivotally displace said latch between a latched position wherein said clamp is retained in the closed position and an unlatched position wherein said clamp is released to the open/release position, said latch comprising a latch arm with a pair of transversely spaced sides each having a pair of opposed tabs which engage a corresponding detent defined on each of said clamp arms in the latched position;

a safety cover pivotally attached relative to said body frame and displaceable between a secured position wherein said safety cover retains said clamp, latch and lanyard in the latched position and an unsecured position wherein said safety cover allows access to said lanyard;

wherein said stopper is passed through said gap in the open/release position and positioned between said body frame and clamp, said clamp is pivoted narrowing said gap between $G_1$ and $G_2$, and said clamp bar and body retaining said webbing stopper in said closed position and retained by said latch in said latched position, and wherein when said safety cover is maneuvered into said unsecured position, said latch may be maneuvered into said unlatched position allowing said clamp bar to pivot away from the body frame to the open/release position, enlarging said gap between $G_2$ and $G_1$, and releasing said webbing stopper through said gap having said dimension $G_1$.

2. The canopy release assembly of claim 1, wherein said webbing material is folded to form a substantially uniform thickness T which is less than the dimension of the enlarged gap and greater than the dimension of the restricted gap.

3. The canopy release assembly of claim 2, wherein said folds of said webbing material are sewn together to form said webbing stopper having a substantially uniform thickness T.

4. The canopy release assembly of claim 2, wherein said dimension $G_1$ is wider than T and said dimension $G_2$ is narrower than T.

5. The canopy release assembly of claim 1, wherein upper portions of said webbing stopper are contoured such that said upper portions of said webbing stopper provide a secure connection between said riser and said releasable body assembly when said clamp is configured in said closed position, and said webbing stopper passes through said gap when said clamp is configured in said open/release position.

6. The canopy release assembly of claim 1, wherein said tabs project outwardly from a distal end of a leaf spring disposed in each of said sides of said latch arm.

7. The canopy release assembly of claim 1, wherein said safety cover is pivotally mounted to a tongue disposed on a lower portion of said body frame via a flat spring which biases said safety cover toward said secured position.

8. The canopy release assembly of claim 1, wherein said clamp and said latch each has a free end and a pivot end and are each longitudinally pivotable about clamp and latch pivot rods located at said clamp and latch pivot ends, respectively, said clamp bar is located adjacent said clamp pivot rod, said clamp has a latch bar located at said clamp free end, said latch has a latch cradle located adjacent said latch pivot rod, and wherein said latch bar is received in said latch cradle when in said latched position.

9. The canopy release assembly of claim 1, wherein said clamp and said body frame define a cage cavity which receives said webbing stopper when said clamp is configured in said closed position.

10. A method of reversibly attaching a parachute canopy to a harness comprising:

providing a releasable body attached to a harness, said releasable body comprising a body frame attached to said harness, a clamp pivotally attached to said body frame having a clamp bar and defining an adjustable gap having a dimension G, a latch pivotally attached to said body frame and having a lanyard, and a safety cover pivotally attached relative to said body frame;

inserting a webbing stopper having a thickness T and attached to a riser into said gap;

retaining said webbing stopper in a cage cavity defined intermediate said clamp and said body frame by pivoting said clamp between an open/release position and a closed position, narrowing said gap dimension defined between said clamp bar and said body from a gap dimension $G_1$ slightly larger than T to a gap dimension $G_2$ narrower than T; and retaining said clamp in said closed position by pivoting said latch into a latched position where opposed tabs projecting from transversely spaced sides of said latch engage detents defined on said clamp, a latch cradle disposed adjacent a latch pivot bar retaining a latch bar disposed on a free end of said clamp.

11. The method of reversibly attaching a parachute canopy to a harness of claim 10, wherein retaining said webbing stopper in said cage cavity further comprises securing said latch and said clamp in said latched position by pivoting said safety cover toward said body frame such that said safety cover obscures access to said lanyard of said latch.

12. The method of reversibly attaching a parachute canopy to a harness of claim 11, wherein securing said latch and said clamp in said latched position further comprises engaging transversely spaced walls configured on said safety cover with opposed outer intermediate sides of said clamp.

13. The method of reversibly attaching a parachute canopy to a harness of claim 12, wherein securing said latch and said clamp in said latched position further comprises resiliently accommodating and slidably engaging said walls with outwardly recessed sides and shoulders of said clamp.

14. A canopy release assembly comprising:
a riser;
a webbing stopper attached to said riser comprising webbing material;
a harness;
a releasable body assembly attached to said harness comprising:
a body frame attached to said harness;
a clamp pivotally attached to said body frame and having a clamp bar, said clamp being pivotally displaceable between a closed position defining a gap with said body frame having a dimension $G_2$ and an open/release position defining a gap having a dimension $G_1$ wherein $G_1$ is larger than $G_2$;
a latch pivotally attached to said body frame and having a lanyard to pivotally displace said latch between a latched position wherein said clamp is retained in the closed position and an unlatched position wherein said clamp is released to the open/release position;
a safety cover pivotally attached relative to said body frame and displaceable between a secured position wherein said safety cover retains said clamp, latch and lanyard in the latched position and an unsecured position wherein said safety cover allows access to said lanyard;

wherein said stopper is passed through said gap in the open/release position and positioned between said body frame and clamp, said clamp is pivoted narrowing said gap between $G_1$ and $G_2$, and said clamp bar and body retaining said webbing stopper in said closed position and retained by said latch in said latched position, and wherein when said safety cover is maneuvered into said unsecured position, said latch may be maneuvered into said unlatched position allowing said clamp bar to pivot away from the body frame to the open/release position, enlarging said gap between $G_2$ and $G_1$, and releasing said webbing stopper through said gap having said dimension $G_1$, and said clamp and said latch each has a free end and a pivot end and are each longitudinally pivotable about clamp and latch pivot rods located at said clamp and latch pivot ends, respectively, said clamp bar is located adjacent said clamp pivot rod, said clamp has a latch bar located at said clamp free end, said latch has a latch cradle located adjacent said latch pivot rod, and wherein said latch bar is received in said latch cradle when in said latched position.

15. The canopy release assembly of claim 14, wherein said clamp comprises a pair of clamp arms which carry said clamp bar.

16. The canopy release assembly of claim 15, wherein said latch comprises a latch arm with a pair of transversely spaced sides each having a pair of opposed tabs which engage a corresponding detent defined on each of said clamp arms in the latched position.

17. The canopy release assembly of claim 15, wherein said safety cover has transversely spaced walls engageable with outer intermediate sides of each of said clamp arms to retain said clamp and latch in said secured position.

18. A canopy release assembly comprising:
a riser;
a webbing stopper attached to said riser comprising webbing material;
a harness;
a releasable body assembly attached to said harness comprising:
a body frame attached to said harness;
a clamp pivotally attached to said body frame and having a pair of arms which carry a clamp bar, said clamp being pivotally displaceable between a closed position defining a gap with said body frame having a dimension $G_2$ and an open/release position defining a gap having a dimension $G_1$ wherein $G_1$ is larger than $G_2$;
a latch pivotally attached to said body frame and having a lanyard to pivotally displace said latch between a latched position wherein said clamp is retained in the closed position and an unlatched position wherein said clamp is released to the open/release position;
a safety cover pivotally attached relative to said body frame and displaceable between a secured position wherein said safety cover retains said clamp, latch and lanyard in the latched position and an unsecured position wherein said safety cover allows access to said lanyard, said safety cover having transversely spaced walls engageable with outer intermediate sides of each of said clamp arms to retain said clamp and latch in said secured position;
wherein said stopper is passed through said gap in the open/release position and positioned between said body frame and clamp, said clamp is pivoted narrowing said gap between $G_1$ and $G_2$, and said clamp bar and body retaining said webbing stopper in said closed position and retained by said latch in said latched position, and wherein when said safety cover is maneuvered into said unsecured position, said latch may be maneuvered into said unlatched position allowing said clamp bar to pivot away from the body frame to the open/release position, enlarging said gap between $G_2$ and $G_1$, and releasing said webbing stopper through said gap having said dimension $G_1$.

19. The canopy release assembly of claim 18, wherein said clamp arms are outwardly recessed and have a shoulder which resiliently accommodates and slidably engages said safety cover.

20. The canopy release assembly of claim 18, wherein said walls each have a guide skirt oriented such that said safety cover snaps into position over the latch and clamp in the secured position.

21. The canopy release assembly of claim 18, wherein a pair of lock tabs project from each of said safety cover walls and inwardly engage apertures defined in said clamp arms to secure said clamp and said latch in said secured position.

* * * * *